Sept. 22, 1925.

W. J. DOBKIN

GEARING TRANSMISSION

Filed Dec. 10, 1921    2 Sheets-Sheet 1

1,554,956

W. J. DOBKIN
INVENTOR

BY Victor J. Evans
ATTORNEY

Sept. 22, 1925.

W. J. DOBKIN 1,554,956

GEARING TRANSMISSION

Filed Dec. 10, 1921

W. J. DOBKIN
INVENTOR

BY Victor J. Evans
ATTORNEY

Patented Sept. 22, 1925.

1,554,956

UNITED STATES PATENT OFFICE.

WILLIAM J. DOBKIN, OF CHICAGO, ILLINOIS.

GEARING TRANSMISSION.

Application filed December 10, 1921. Serial No. 521,509.

*To all whom it may concern:*

Be it known that I, WILLIAM J. DOBKIN, a citizen of the United States, residing at Chicago, in the county of Cook and State of Illinois, have invented new and useful Improvements in Gearing Transmissions, of which the following is a specification.

This invention relates to gearing for transmitting power from a driving shaft to a driven shaft and an object of the invention is to provide a transmission gearing embodying planetary and bevel gears in combination with friction wheels for transmitting power from an engine shaft or engine to the driving shaft of a motor vehicle or analogous structure, which gearing structures are associated in such a manner as to permit a gradual increasing of the speed of the driven shaft and eliminating liability of stripping gears such as is contingent with the approved type of shiftable transmission gearing as well as eliminating the ill effects of sudden shifts or changes in speed.

Another object of the invention is to provide a gearing structure as specified which combines with the arrangement of gradually changeable gearing, the flexibility of a friction drive and positiveness of tooth gearing.

Other objects of the invention will appear in the following detailed description taken in connection with the accompanying drawings wherein.

Figure 1:
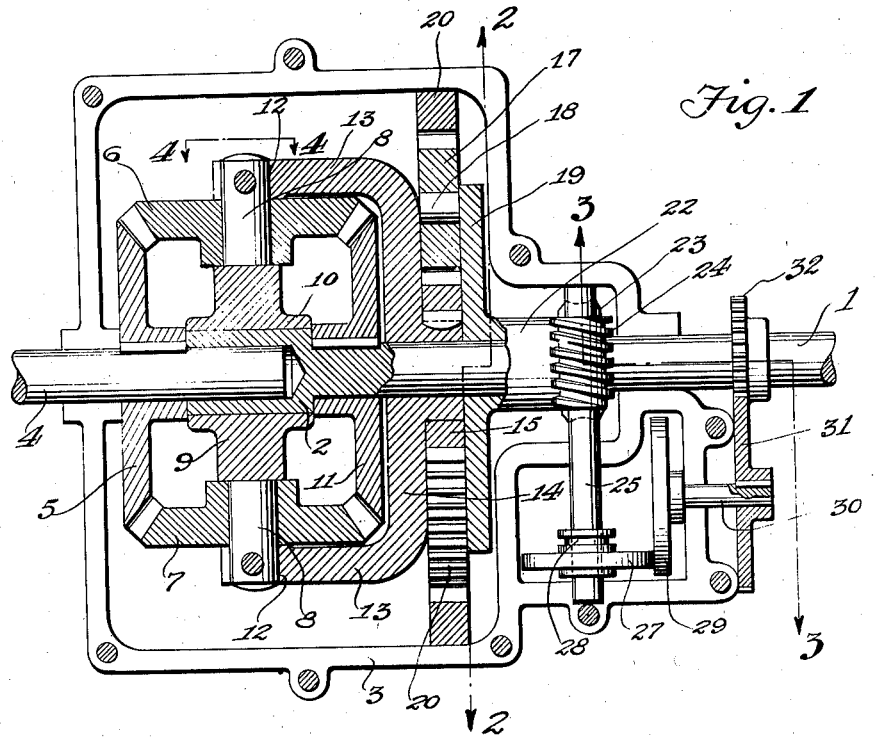
Fig. 1 is a longitudinal section through the improved gearing.
Figure 2:
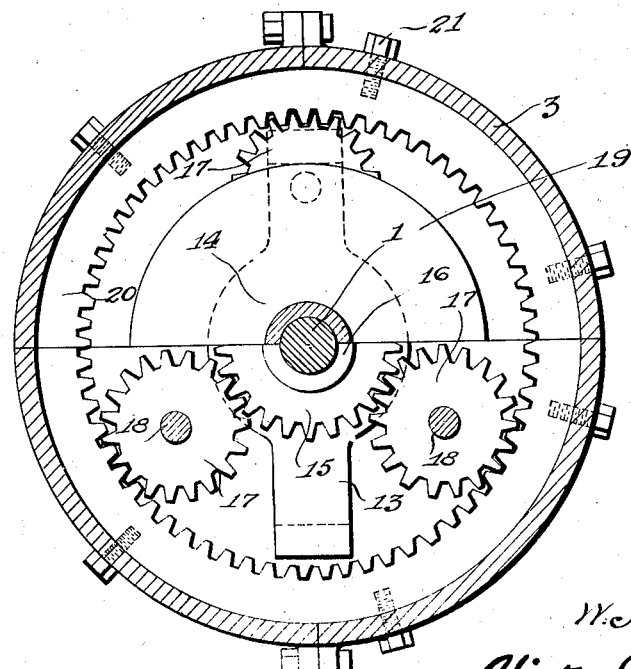
Fig. 2 is a section taken on the line 2—2 of Fig. 1.

Referring more particularly to the drawings, the driving shaft 1 is adapted to have connection with an engine, motor or other prime mover and it has an enlarged recessed end 2 located in the gear casing 3 into which the inner end of the driven shaft 4 extends. The driven shaft 4 has a bevel gear 5 keyed thereon which meshes with idler bevel gears 6 and 7 carried by the stub shaft ends 8 of the coupling 9. The hub 10 of which is mounted upon the enlarged end 2 of the driving shaft 1. A bevel gear 11 is keyed upon the driving shaft 1 and meshes with the gears 6 and 7. The stub shaft ends 8 of the coupling 9 project into the forked ends 12 of the arms 13 of a spider 14 which is rotatably mounted upon the driving shaft 1 and rotation of which is controlled by a planetary gearing structure comprising a gear 15, keyed upon the hub 16 of the spider 13 and with which gear the movable or planetary gears 17 mesh. The gears 17 are rotatably carried by stub shafts 18 which project laterally from a disc 19 which is also mounted upon the driving shaft 1 for independent rotation relative thereto. The gears 17 are adapted to travel in a circular path concentrically of the shaft 1 and they mesh with the internal ring gear 20 which is rigidly attached to the casing 3 in any suitable manner such as by bolts 21.

Figure 3:
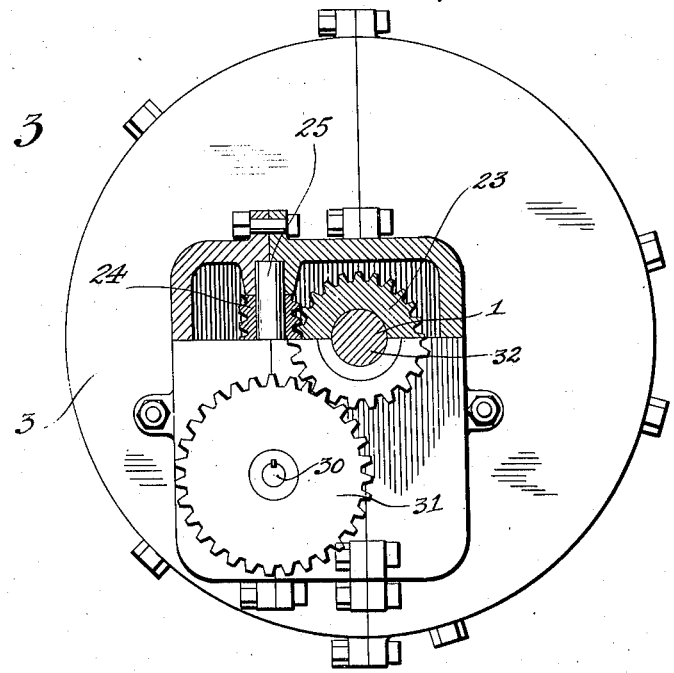
Fig. 3 is a section taken on the line 3—3 of Fig. 1.
Figure 4:
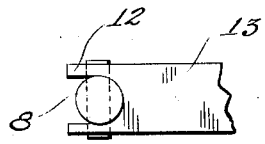
Fig. 4 is a fragmentary view of a part of the gearing structure, the said portion indicated by the line 4—4 on Fig. 1 of the drawings.
Figure 5:
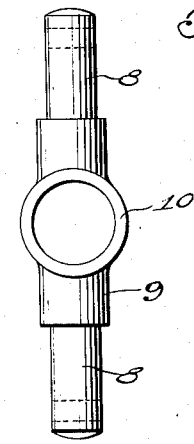
Fig. 5 is a detail view of a gear carrying coupling.

The hub 22 of the disc 19 has a worm gear 23 mounted thereon with which the worm 24 meshes. The worm 24 is carried by a shaft 25 which extends transversely to the driving shaft 1 and is rotatably supported by suitable bearings in the casing 3. The shaft 25 has a friction disc 27 feathered thereon which friction disc has a channel collar 28 carried thereby to permit connection of a shifting lever therewith. The friction disc 27 engages with its periphery, the friction face of a second friction disc 29 for rotating the shaft 25. The disc 29 is carried by a shaft 30 which is in turn operatively connected to the driving shaft 1 by gears 31 and 32 as clearly shown in Figs. 1 and 3 of the drawings.

When the disc 27 is shifted so that it will engage the disc 29 at the center or axis of the disc 29 the shaft 25 will be stationary, however, as the disc 27 is shifted outwardly towards the perimeter of the disc 29 the shaft 25 will be rotated, the speed of the shaft 25 depending upon the distance of the point of contact of the friction disc 27 with the friction disc 29 from the axis of the latter disc. The rotation of the shaft 25 will be imparted through the worm gear 23 to the disc 19 which will in turn rotate the gears 17 and move them about the ring gear 20 rotating them in a planetary manner and above their individual axis which will impart rotation to the yoke 14 and move the gears 6 and 7 about the bevel gears 5 and 11 resulting in a decreasing in the speed of rotation the gear 5 from the gear 11, the ratio of the relative speeds of the bevel gears 5 and 11 depending upon the speed of rotation of the yoke 14. By calculation the point of engagement between the friction discs 27 and 29 at which the slowest speed of the gear 5 and consequently of the shaft 4 may be obtained and as the friction disc 27 is moved beyond this point, momentarily the gear 5 will be stationary relative to the gear 11 and upon further movement the gear 5 will be rotated in a reverse direction to the direction in which it is normally or was previously rotated thus providing for the reversing of the direction of rotation of the shaft 4 which reversing is caused by the increased rate of rotating speed of the gears 6 and 7 about the axis of the shafts 1 and 4.

When the shaft 25 is stationary at which time the yoke 14 is also stationary the shaft 4 will be driven direct from the shaft 1 at the same speed of rotation of the shaft 1 through the bevel gears 5, 6, 7 and 11.

It is of course, to be understood that the invention may be constructed in other manners and the parts associated in other relations and, therefore, I do not desire to be limited in any manner except as set forth in the claims hereunto appended.

Having thus described my invention what I claim is:

1. In a gear transmission, a driven shaft and a driving shaft, a bevel gear on the driven shaft, a similar gear on the driving shaft, stub shafts supported upon the driving shaft, bevel gears carried thereby and meshing with the gears on the driven and driving shaft, a stationary ring gear, a planet carrier disc, a plurality of gears carried by said disc and meshing with the ring gear, a spider on the drive shaft, a gear carried by the spider and meshing with the gears on the disc, means connecting the spider with the stub shafts for moving the same about the axis of the driving shaft, and adjustable power transmitting means connecting said driving shaft and said disc for controlling the rotation of the disc.

2. In a gear transmission, a driven shaft and a driving shaft, a bevel gear on the driven shaft, a similar gear on the driving shaft, stub shafts supported upon the driving shaft, bevel gears carried thereby and meshing with the gears on the driven and driving shaft, a stationary ring gear, a planet carrier disc, a plurality of gears carried by said disc and meshing with the ring gear, a spider on the drive shaft, a gear carried by the spider and meshing with the gears on the disc, means connecting the spider with the stub shafts for moving the same about the axis of the driving shaft, a pair of right angularly disposed friction discs, means connecting one of said discs to said driving shaft, the other of said discs being adjustable, and means connecting said adjustable friction disc to said planet carrier disc.

3. In a gear transmission, the combination of a driving shaft and a driven shaft, a bevel gear on the driven shaft and a bevel gear on the driving shaft, additional gears operatively engaging the above gears and rotatable about the axis of the shafts, a planetary gear structure, comprising operatively connected gears all lying in the same general plane, means forming operable connection between the planetary gear structure and the last named bevel gears for controlling the ratio of speed rotation of said drive and driven shafts, and friction discs for controlling the operation of said planetary gears.

4. In a gear transmission, the combination of a driving shaft and a driven shaft, a bevel gear on the driven shaft and a bevel gear on the driving shaft, additional gears operatively engaging the above gears and rotatable about the axis of the shafts, a planetary gear structure comprising operatively connected gears all lying in the same general plane, means forming operable connection between the planetary gear structure and the last named bevel gears for controlling the ratio of speed rotation of said drive and driven shafts, an auxiliary shaft a worm and worm gear connection between said auxiliary shaft and planetary gear structure, and speed controlling means controlling rotation of said auxiliary shaft and the operation of said planetary gearing.

5. In a gear transmission, the combination of a driving shaft and a driven shaft, a bevel gear on the driven shaft and a bevel gear on the driving shaft, additional gears operatively engaging the above gears and rotatable about the axis of the shafts, a planetary gear structure, comprising operatively connected gears all lying in the same general plane, means forming operable connection between the planetary gear structure and the last named bevel gears for controlling the ratio of speed rotation of said drive and driven shafts, an auxiliary shaft, a worm and worm gear connection between said auxiliary shaft and planetary gear structure, speed controlling means controlling rotation of said auxiliary shaft and the operation of said planetary gearing, friction discs for controlling the operation of the planetary gear structure, and means connecting said friction discs and driving shaft.

In testimony whereof I affix my signature.

WILLIAM J. DOBKIN.